United States Patent
Hutchins et al.

(10) Patent No.: US 11,586,771 B2
(45) Date of Patent: Feb. 21, 2023

(54) INTEGRATED VISUALIZATION OF MULTIPLE APP DATA

(71) Applicant: Glance, LLC, Blaine, MN (US)

(72) Inventors: Chad Hutchins, Whitehouse, TX (US); Jason Eggers, Blaine, MN (US); Jon Sheppard, Tomball, TX (US)

(73) Assignee: Glance, LLC, Blaine, MN (US)

( * ) Notice: Subject to any disclaimer, the term of this patent is extended or adjusted under 35 U.S.C. 154(b) by 211 days.

(21) Appl. No.: 17/073,250

(22) Filed: Oct. 16, 2020

(65) Prior Publication Data

US 2021/0117560 A1 Apr. 22, 2021

Related U.S. Application Data

(60) Provisional application No. 62/916,913, filed on Oct. 18, 2019.

(51) Int. Cl.
*G06F 21/62* (2013.01)
*H04L 9/40* (2022.01)
*G06F 9/54* (2006.01)

(52) U.S. Cl.
CPC ............ *G06F 21/629* (2013.01); *G06F 9/547* (2013.01); *H04L 63/08* (2013.01)

(58) Field of Classification Search
CPC .. G06F 21/629; G06F 9/547; G06F 2209/545; H04L 63/08; H04L 63/0815; H04L 63/0876; H04L 63/083
See application file for complete search history.

(56) References Cited

U.S. PATENT DOCUMENTS

| | | | | |
|---|---|---|---|---|
| 7,596,766 | B1* | 9/2009 | Sharma | G06F 3/0481 715/713 |
| 8,146,097 | B2* | 3/2012 | Mukundan | G06F 9/542 707/610 |
| 8,713,467 | B1* | 4/2014 | Goldenberg | G06F 3/04845 715/781 |
| 9,544,181 | B1* | 1/2017 | Aithal | H04L 41/0246 |
| 9,916,295 | B1* | 3/2018 | Crawford | G06F 40/166 |
| 11,188,719 | B1* | 11/2021 | Anand | G06N 3/04 |
| 11,206,269 | B1* | 12/2021 | Van Deman | G06F 21/45 |
| 11,290,439 | B1* | 3/2022 | DePue | H04L 63/0853 |
| 2002/0019972 | A1* | 2/2002 | Grier | G06F 8/71 717/122 |
| 2006/0161668 | A1* | 7/2006 | Mathew | H04L 63/083 726/4 |
| 2007/0198944 | A1* | 8/2007 | Viswanathan | G06F 9/451 715/708 |
| 2008/0254429 | A1* | 10/2008 | Woolf | G09B 7/02 706/45 |
| 2009/0282106 | A1* | 11/2009 | Jaffer | H04M 3/5191 709/206 |
| 2010/0235829 | A1* | 9/2010 | Shukla | H04L 67/34 717/177 |

(Continued)

*Primary Examiner* — Aravind K Moorthy

(74) *Attorney, Agent, or Firm* — Schwegman Lundberg & Woessner, P.A.

(57) ABSTRACT

An integrated third-party API data visualization process (ITPDVP) provides the ability to gather information from multiple different sources into a single view without a user of the device having to navigate to each source from which information is gathered. ITPDVP is a process that allows a user to visualize data from one or more third party API sources from within a context view client.

13 Claims, 10 Drawing Sheets

(56) References Cited

U.S. PATENT DOCUMENTS

| | | | | |
|---|---|---|---|---|
| 2010/0268762 A1* | 10/2010 | Pahlavan | | G06F 3/0485 |
| | | | | 709/203 |
| 2010/0269152 A1* | 10/2010 | Pahlavan | | H04L 63/0853 |
| | | | | 715/740 |
| 2010/0271288 A1* | 10/2010 | Srinivasan | | G06F 3/1454 |
| | | | | 345/2.2 |
| 2010/0325536 A1* | 12/2010 | Kong | | G06F 16/93 |
| | | | | 715/255 |
| 2011/0145794 A1* | 6/2011 | Gerginov | | G06F 11/3696 |
| | | | | 717/125 |
| 2012/0066620 A1* | 3/2012 | Teng | | G06F 9/451 |
| | | | | 715/762 |
| 2012/0260267 A1* | 10/2012 | Cucu | | G06F 9/541 |
| | | | | 719/328 |
| 2014/0114753 A1* | 4/2014 | Xiao | | G06Q 30/02 |
| | | | | 705/14.49 |
| 2015/0007278 A1* | 1/2015 | Benezra | | G06F 21/31 |
| | | | | 726/5 |
| 2015/0067035 A1* | 3/2015 | Sullad | | H04L 67/01 |
| | | | | 709/203 |
| 2018/0077142 A1* | 3/2018 | Thakkar | | H04L 63/0807 |
| 2018/0173706 A1* | 6/2018 | Dev | | G06F 16/24565 |
| 2018/0262529 A1* | 9/2018 | Allen | | G06F 21/566 |
| 2019/0050557 A1* | 2/2019 | Martin | | H04L 63/08 |
| 2019/0303466 A1* | 10/2019 | Khurana | | G06F 16/24568 |
| 2020/0073682 A1* | 3/2020 | Strinden | | H04L 67/02 |
| 2020/0336314 A1* | 10/2020 | Barakat | | H04L 9/3247 |
| 2021/0014062 A1* | 1/2021 | Bhattacharjee | | H04L 9/3073 |

\* cited by examiner

INTEGRATED VISUALIZATION OF MULTIPLE APP DATA

PRIORITY

This Application claims the benefit of priority to U.S. Provisional Patent Application Ser. No. 62/916,913, filed Oct. 18, 2019, which is incorporated by reference herein its entirety.

BACKGROUND

Apps or applications that could be anything including web based, mobile, or stand-alone applications may be tailored to very specific functions. Users may use hundreds of different applications, each operating on data tailored to the specific function the corresponding app is designed for. Users may find occasions where they need data from multiple different apps. It can be very cumbersome navigating between the apps to find the data needed for such occasions and remembering the data during such navigation.

One such occasion may involve looking at an invoice for a customer in a first application while needing information from a customer relationship manager application.

SUMMARY

An integrated third-party API data visualization process (ITPDVP) provides the ability to gather information from multiple different sources into a single view without a user of the device having to navigate to each source from which information is gathered. ITPDVP is a process that allows a user to visualize data from one or more third party API sources from within a context view client.

DETAILED DESCRIPTION

Figure 1:
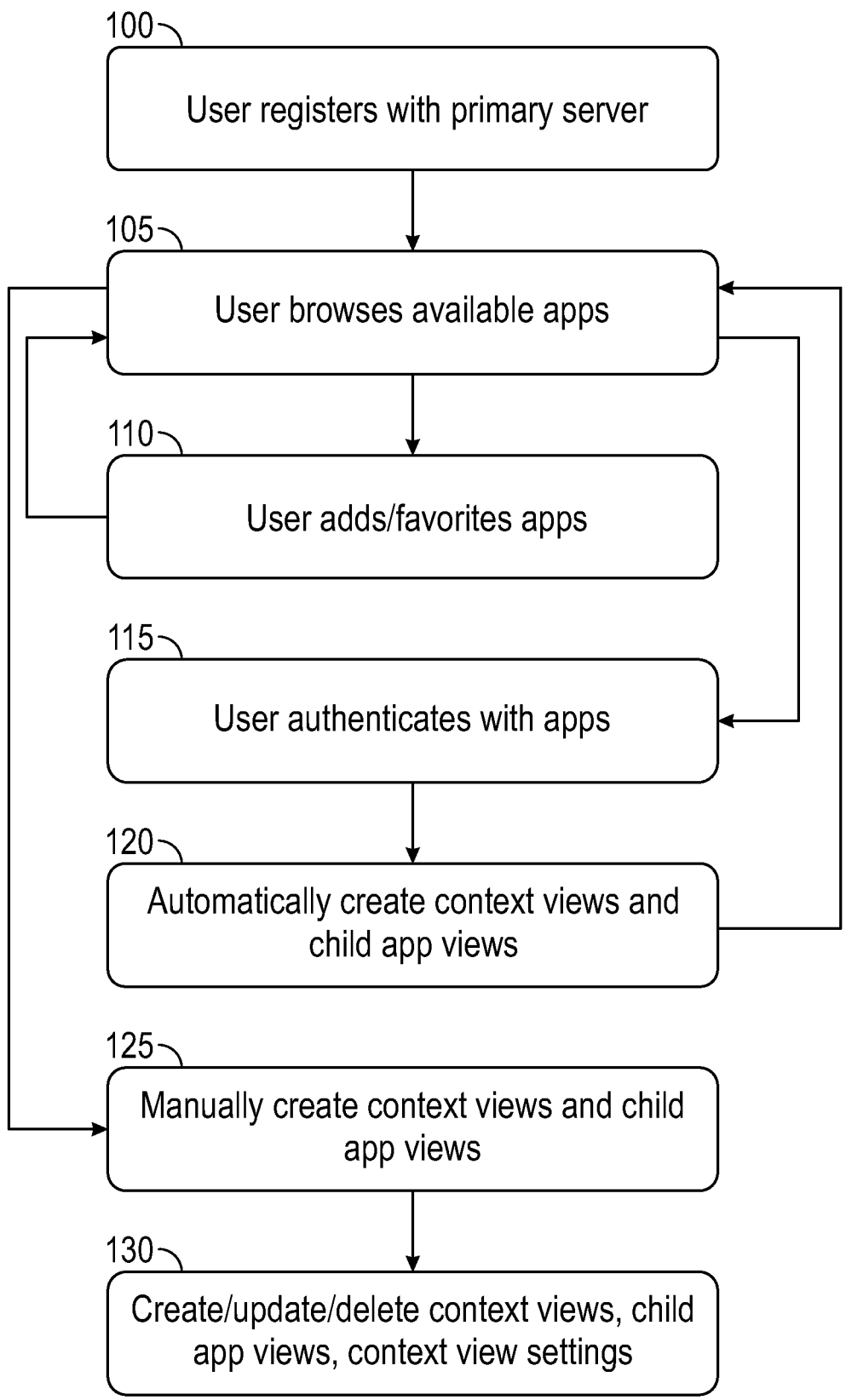
FIG. 1 is a flowchart illustrating a computer implemented process for User registration, App browsing, authenticating Apps and creating Context Views and Child App Views according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

An integrated third-party API data visualization process (ITPDVP) provides the ability to gather information from multiple different sources into a single view without a user of the device having to navigate to each source from which information is gathered. ITPDVP is a process that allows a user to visualize data from one or more third party API sources from within a context view client. In a QuickBooks example, a user may be looking at an invoice for a customer in a view on the device. The same view allows the user to see other pertinent information such as quotes from a customer relationship management (CRM) application, email conversations from one or more email applications, call records, etc.; all from potentially any number of applications or external systems without having to leave that invoice in the QuickBooks application.

FIG. 1 is a flowchart illustrating a computer implemented process for User registration, App browsing, authenticating Apps and creating Context Views and Child App Views according to an example embodiment. Several terms are used in the description of the figures and are set forth initially to provide a context.

Primary System—This is the main server for the system. This is where the ITPDVP operates.

App—Any third party app, service, business that a User may use at their business.

API—Application Programming Interface. APIs are a tool provided by Apps to allow software code to communicate with their App data over the internet.

Context View Client—the UI the User interacts with when visualizing the result of a rendered Context View and Child App Views. The Context View Client contains the logic to communicate with Primary System. The Context View Client may be delivered through a Browser Extension, Native App View or Mobile Application.

Browser Extension—Some Apps do not allow custom views or apps to be created on their platform. However modern web browsers allow custom views to be created called Browser Extensions. ITPDVP uses Browser Extensions as a delivery method for Context Views.

Native App View—Some Apps allow for custom views or apps to be created on their platform. Context Views can be delivered through these custom views.

Context Views—Views that are for a very specific context within an App. Context Views have one or more Child App Views. Context Views can refer a web browser URL address, data on a web page (such as but not limited to email addresses, names, phone numbers, etc.), collaboration tools (such as but not limited to desktop applications Slack and Microsoft Teams), and/or user inputted search data.

Child App View—These views belong to a parent Context View. Based on the Context View they belong to, the Child App View defines what Operations are needed to happen in order to get the data needed to render the view for the User FIG. 1 is a flowchart illustrating a computer implemented process for User registration, App browsing, authenticating Apps and creating Context Views and Child App Views according to an example embodiment. At operation 100, a user first uses the Primary System to create an account by registering with the primary server. From there the User can browse all supported Apps at operation 105. A User can add Apps to their account at operation 110 and authenticate with those Apps at operation 115 in order to visualize data from those Apps. At operation 120, context views and child app views may be automatically created.

All supported Apps have App Contexts and App Views. App Contexts represent what a user is seeing or looking at when working within the App. App Views represent the data that can be pulled from the App through the App's API. A Context View stores the App Context and the related Child App Views. Each Child App View stores the App View to be rendered.

Once Apps are authenticated, Context Views and related Child App Views are automatically created at operation 120 for each of the authenticated Apps based on the App's available Contexts and Views. Context Views can also be manually created at operation 125. A User can continually authenticate with new or old Apps at operation 115, remove Apps, and create, configure, delete new Context Views and Child App Views at operation 130.

Context Views and Child App Views are configurable by the User at operation 130. Context Views and Child App Views may have unique settings based on the context the Context View exists or based on what the Child App View is supposed to display.

Figure 2:
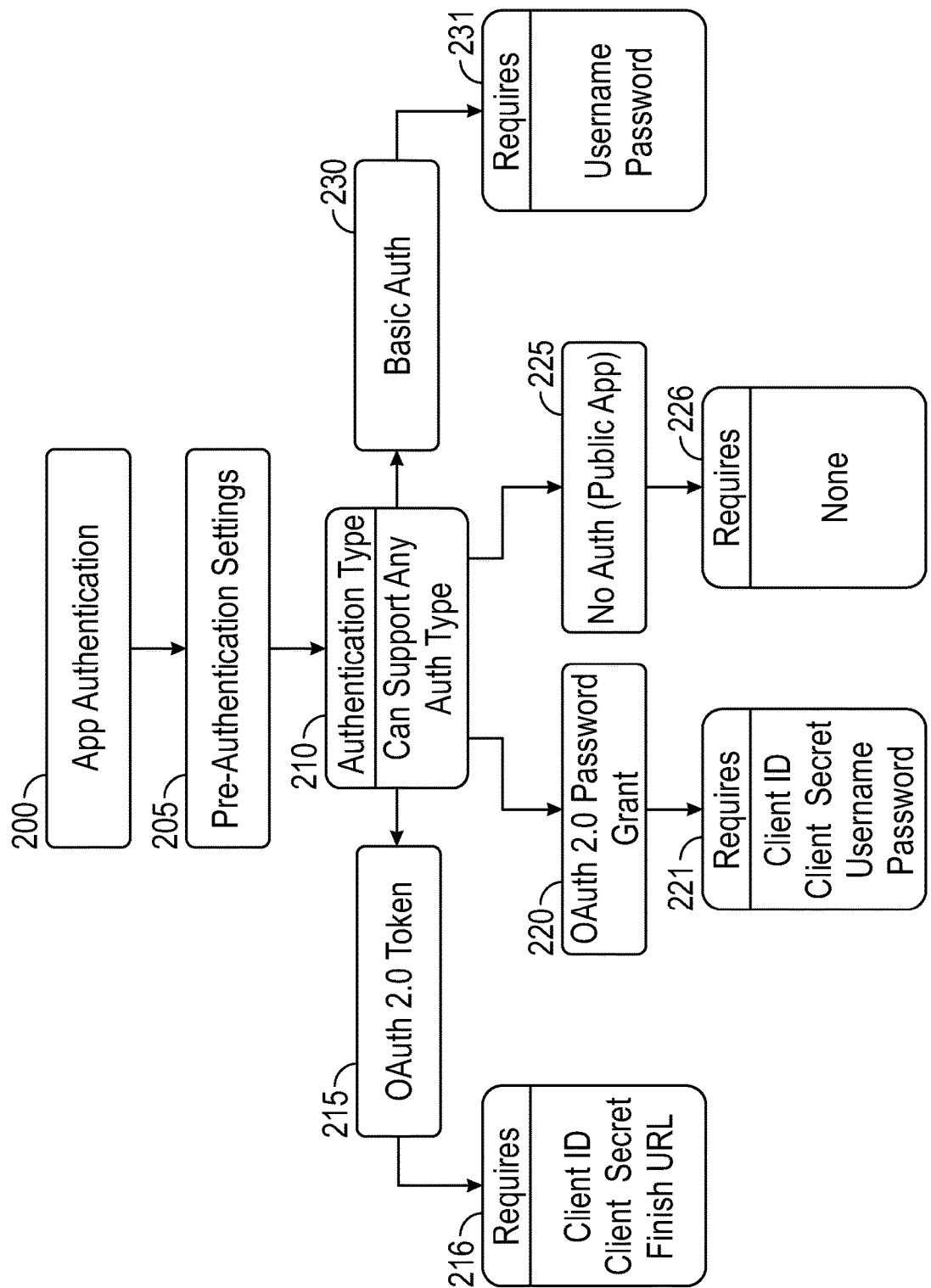
FIG. 2 is a flowchart illustrating various authentication types that are supported for creating views according to an example embodiment.

The Primary System executes a process that supports many types of App Authentication methods such as those shown and stored in a database or other data structure illustrated in FIG. 2. At operation 200, app authentication begins, and pre-authentication settings are retrieved at operation 205. At operation 210, various different types of authentication may be initiated, as any authorization type may be supported. At 215, an OAuth 2.0 token may be used with a client ID, client secret, and finish URL as indicated at 216. At 220, Oauth 2.0 password grant security is used with a client ID, client secret, username, and password as indicated at 221. At 225, no auth, such as for a public app requires no information at 226 in order to obtain data from the app. At 230, basic authorization may be used with a username and password at 231. Additional app authentication methods may also be supported. App authentication methods may also have specific authentication settings that are required, such as specific URLs, subdomains, credentials 216, 221, 226, 231 which may be stored and encrypted in the Primary System database.

FIGS. 3A, 3B, 3C, and 3D represent a block diagram illustrating a life cycle of the process according to an example embodiment. FIGS. 3A-3D illustrate the flow of data from a User's Web Browser Application, to the Primary Server, to the Third Party App APIs, back to the Primary Server and back to the User's Web Browser Application so that the data can be rendered for the User to view with a view of data from the web browser application.

At operation 300, a user may open an application that runs in a web browser. A context view may load at operation 302. At a decision operation 322, if the application is not authenticated with the primary server, a user may provide credentials, such as username and password for the application at operation 306. An authentication API call request is generated and sent at operation 308 via a network, such as public internet at indicated at 999. An authentication API Call response is received at operation 318, and if found to be not successful at operation 320, the user may attempt to log in again at operation 306.

If at decision operation 322 the application is already authenticated with the primary server, or if authentication was successful at operation 320, operation 324 generates an API call request for the context view settings, which is via network connection 999 to the primary server for accessing a database containing the context view settings. The context view settings are provided via an API call response at operation 336 and are saved to a web browser data store at operation 338. The user may then input normal web browser interactions, such as clicking links etc. at operation 398. On a resulting page load, a context view client checks for context match based on the context view settings at operation 397. If a context match is found at operation 346, the context view client gathers relevant contextual data form the web browser DOM and sends a get render data API call request at operation 349. At operation 395, a get render data API call request is received and operation 396 renders the context view client in the web browser. Processing returns to operation 398 to wait for the next interaction via the web browser. Operation 340 operations to periodically repeat the context view settings API call request to make sure the context view client has the latest settings in case an update was performed during the browsing session.

Figure 3A:
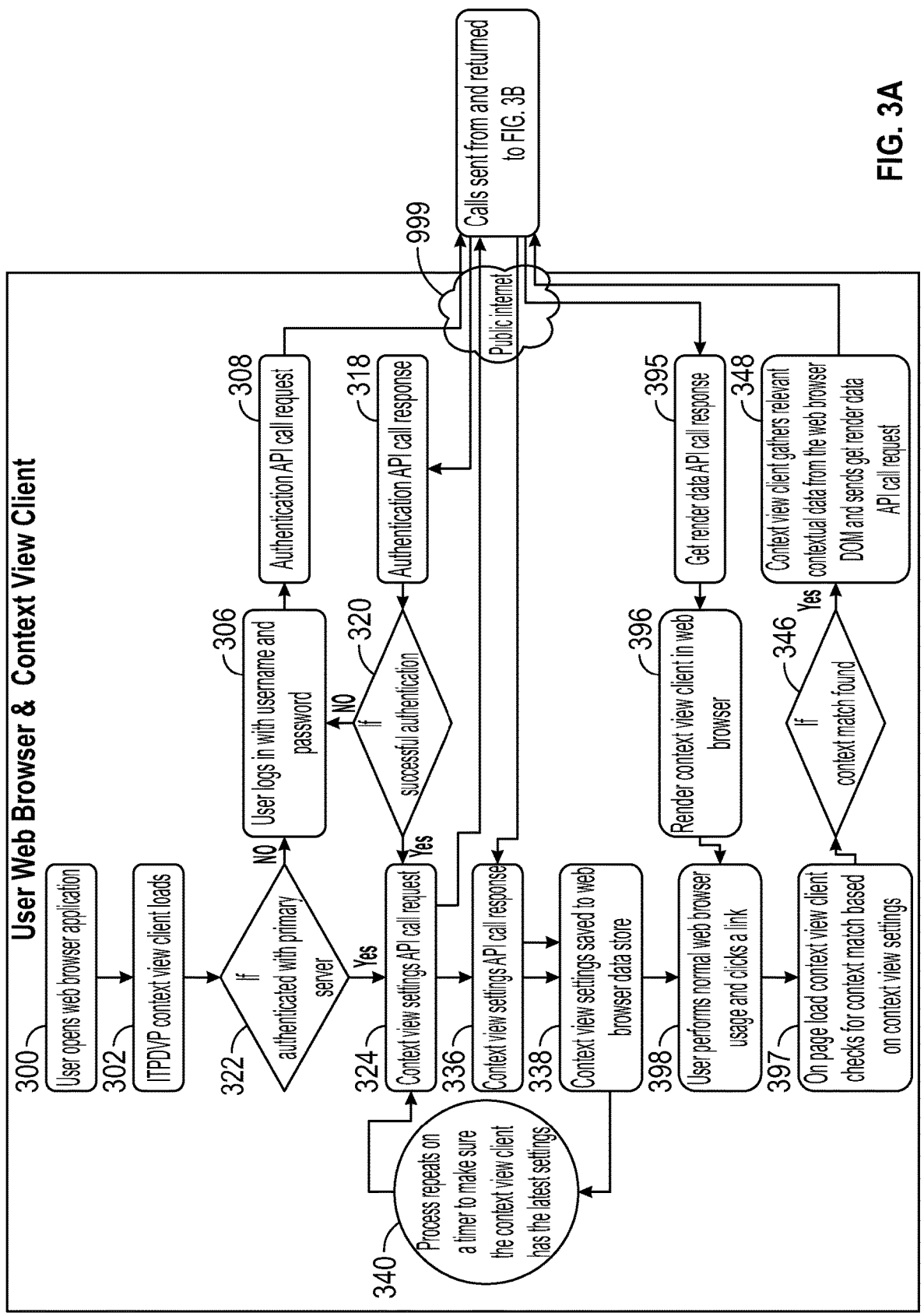
FIGS. 3A, 3B, 3C, and 3D are a block diagram illustrating a life cycle of the process according to an example embodiment.
Figure 3B:
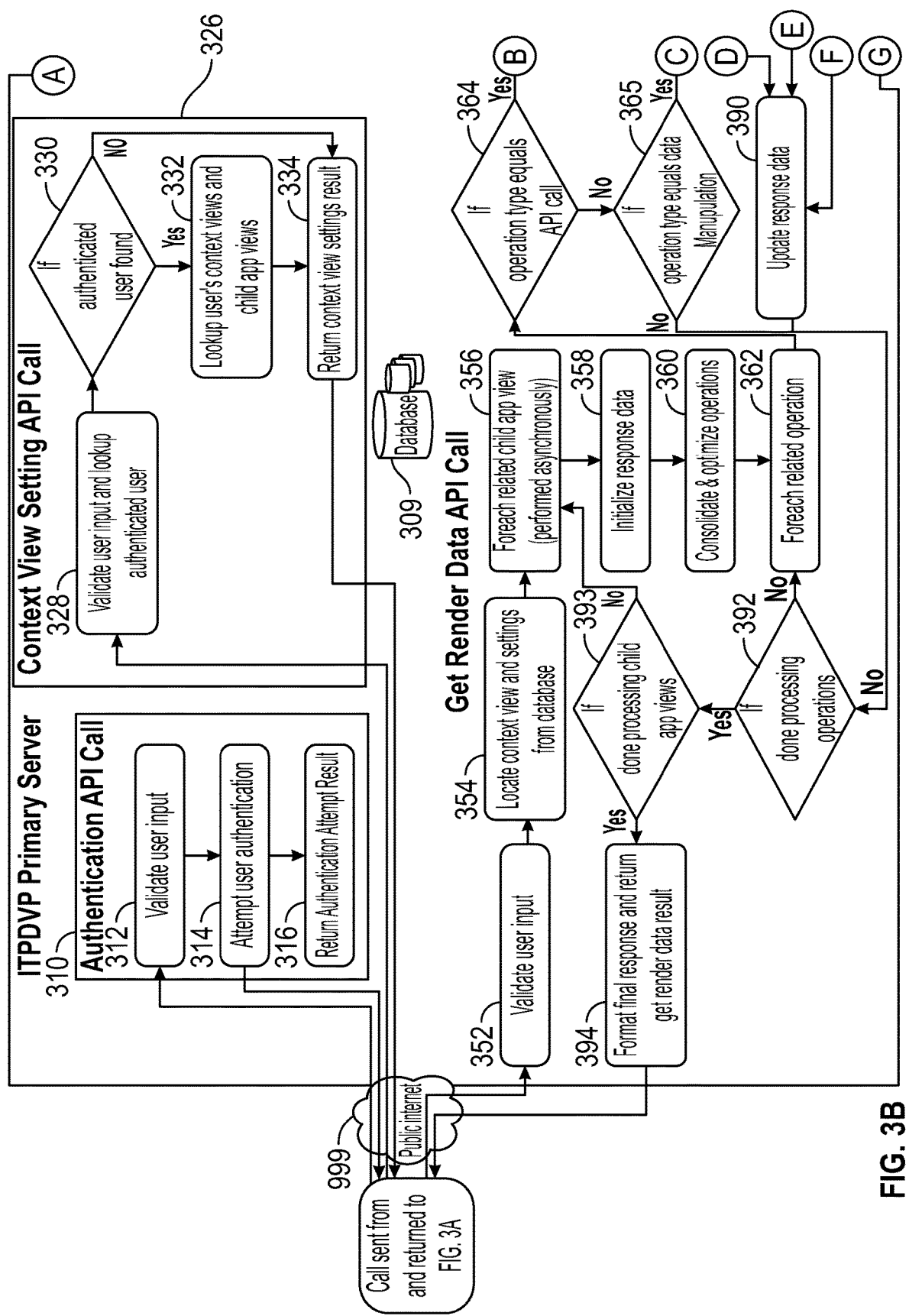
Figure 3C:
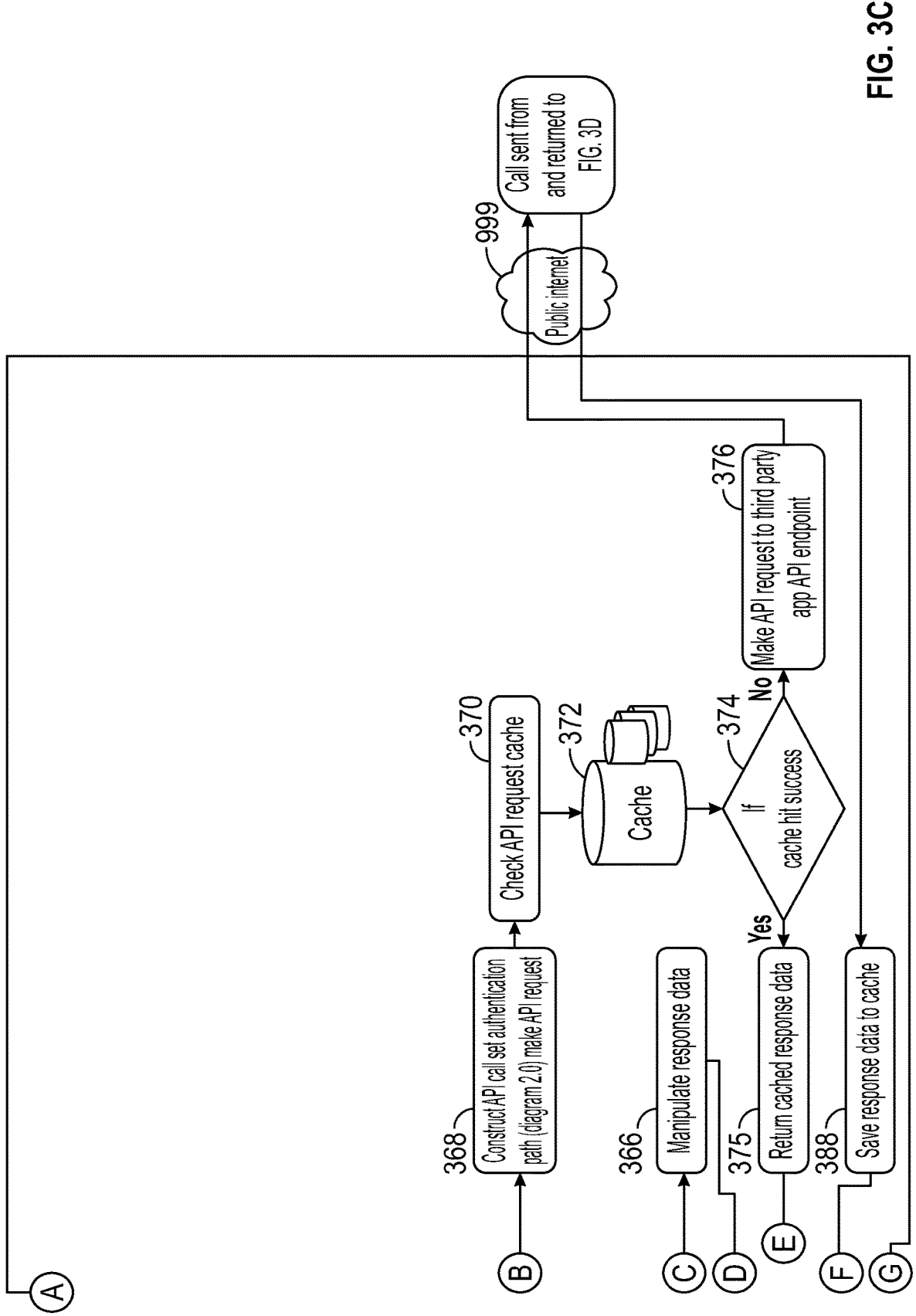
Figure 3D:
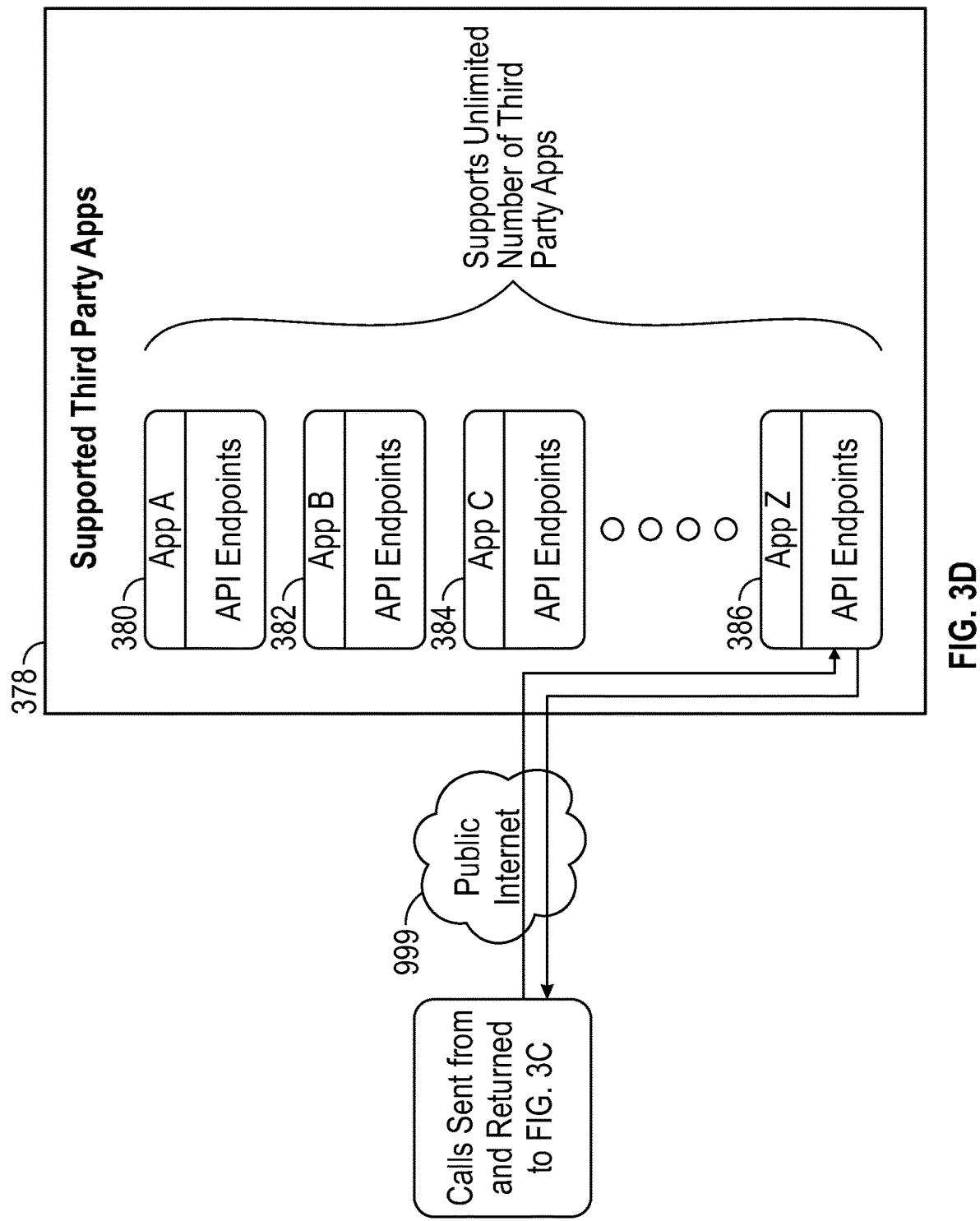

FIG. 3D illustrates endpoint interactions with supported apps 380, 382, 384, 386 in response to calls received view network 999. Any number of apps may be supported, limited only by processing resources available.

FIGS. 3B and 3C illustrate operation of the primary server.

As the User uses their Apps in the Web Browser performing their day-to-day work tasks 398, the Context View Client runs in the background and determines if what the User is looking at matches a Context View that was created on the Primary System. If so, the Context View Client will indicate to the User that there is a Context View with Child App Views to look at. The Child App Views will display relevant data from the other authenticated App's within the current App 396 (see FIGS. 4 and 5).

Figure 4:
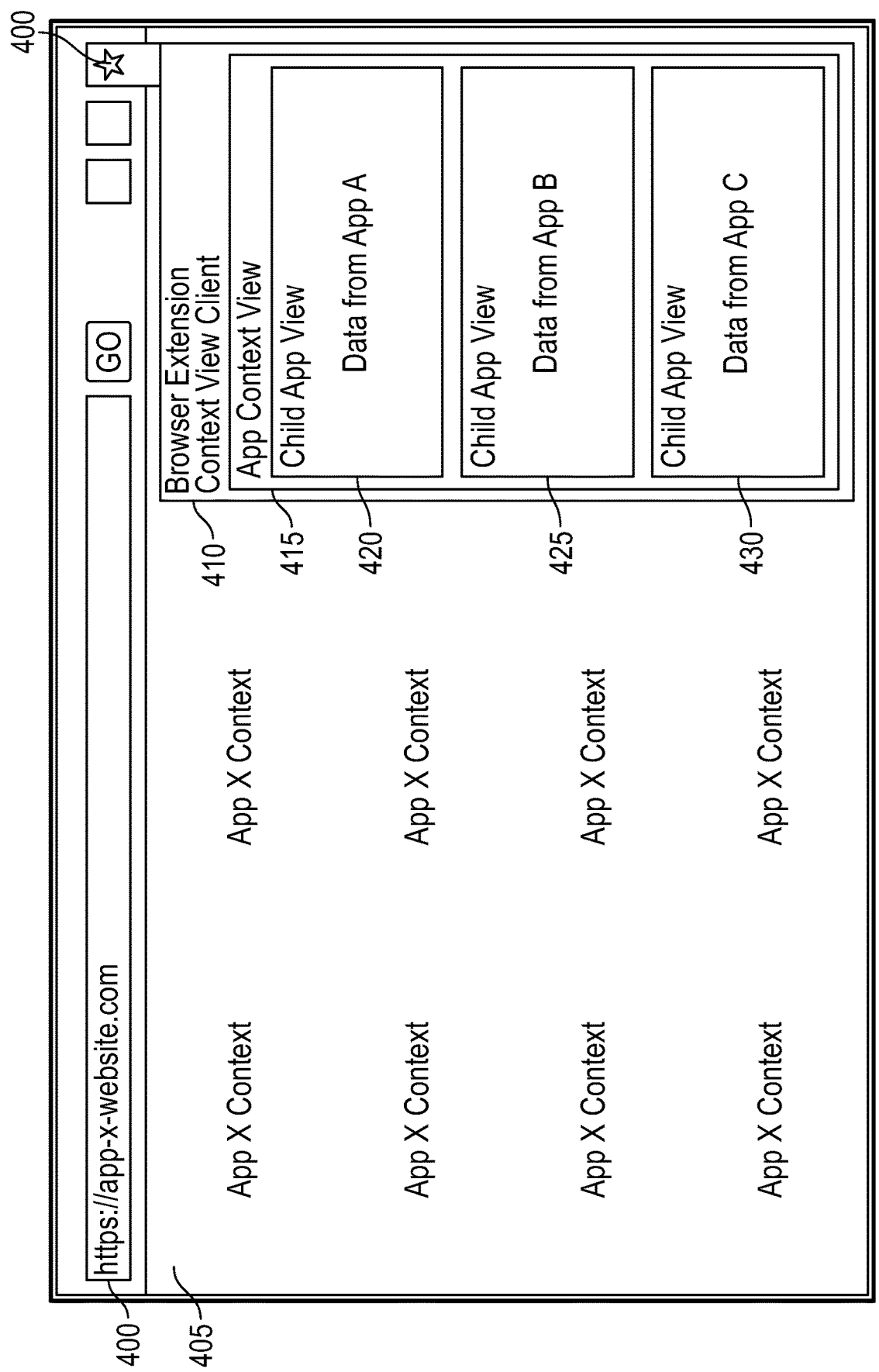
FIG. 4 is block diagram of an example context view client including information from multiple different apps inside a Browser Extension according to an example embodiment.

FIG. 4 is an example context view client including information from multiple different apps inside a Browser Extension according to an example embodiment.

In order to gather the relevant data, the Context View Client first gathers relevant data from the Web Browsers DOM (Diagram 4.405, Diagram 5.505) and makes an API Call to the Primary Server (348). The Primary Server makes sure the request is authenticated and authorized. If the request is not authorized, the user must login with their Primary Server account information in the Context View Client (306). The Primary Server will authenticate the request and respond with a new authentication token (310). Once authenticated, the call to the Primary Server can be made (348). The Primary Server validates (352) user input in the call and looks up the requested Context View in the Primary Server's database (354). Once the Primary Server has the Context View and the associated context data sent with the Context View Client's API Call, it will process each of the related Child App Views (356) by initializing response data at 358, consolidating and optizing operations at 360.

Each Child App View contains a series of Operations (362) that describes the process required to gather the data so that it may be visualized in the Context View Client. Operations consist of API Calls (364) and many types of data manipulations (365) that are used to format the API Call Responses in ways the Primary System can communicate with the Context View Client. All saved Authentication Settings, Context View Settings and Child App View Settings can be used by the operations in order to perform the required operation. Response data is updated at 390 if the operation type does not call for data manipulation at decision block 365. If the operation type equals a data manipulation at decision block 365, the data is manipulated at operation 366.

If at decision block 364, the operation type is an API call, processing continues at operation 368 by constructing an API call et authentication path to make the API request. At operation 370, the API request cache 372 is checked. Decision operation 374 determines if the case hit was successful. If yes, the cach response data is retuened at 375. If not, an API request may be made to a third party application API endpoint at 376 via internet 999. Response data is saved to cache at operation 388.

The processing of all relevant Child App Views can use asynchronous or synchronous processing depending on the need of the views. Caching and optimizations occur when processing all of the Operations across a Context View's Child App Views (360). For API Call operations, data may be cached from previous API Calls to an App's API with consideration to data policies (372). API Calls may also be batched or consolidated depending on an App's API support for batching or if identical calls are required across multiple Child App Views (360).

Once all of the Child App Views' Operations are complete (392, 393) and properly formatted, the data is sent back to the Context View Client, which then renders the data for the User (394).

The Context View Client may be delivered through a Browser Extension as illustrated in FIG. 4. The Browser Extension includes a clickable icon (400) on the browser user interface. When this is clicked, the Context View Client is loaded and visible in a window within the web browser (410).

The process described in FIGS. 3A-D is run. Once it is finished it will render the App Context View (415). Each Child App View is then rendered (420, 425, 430).

Figure 5:
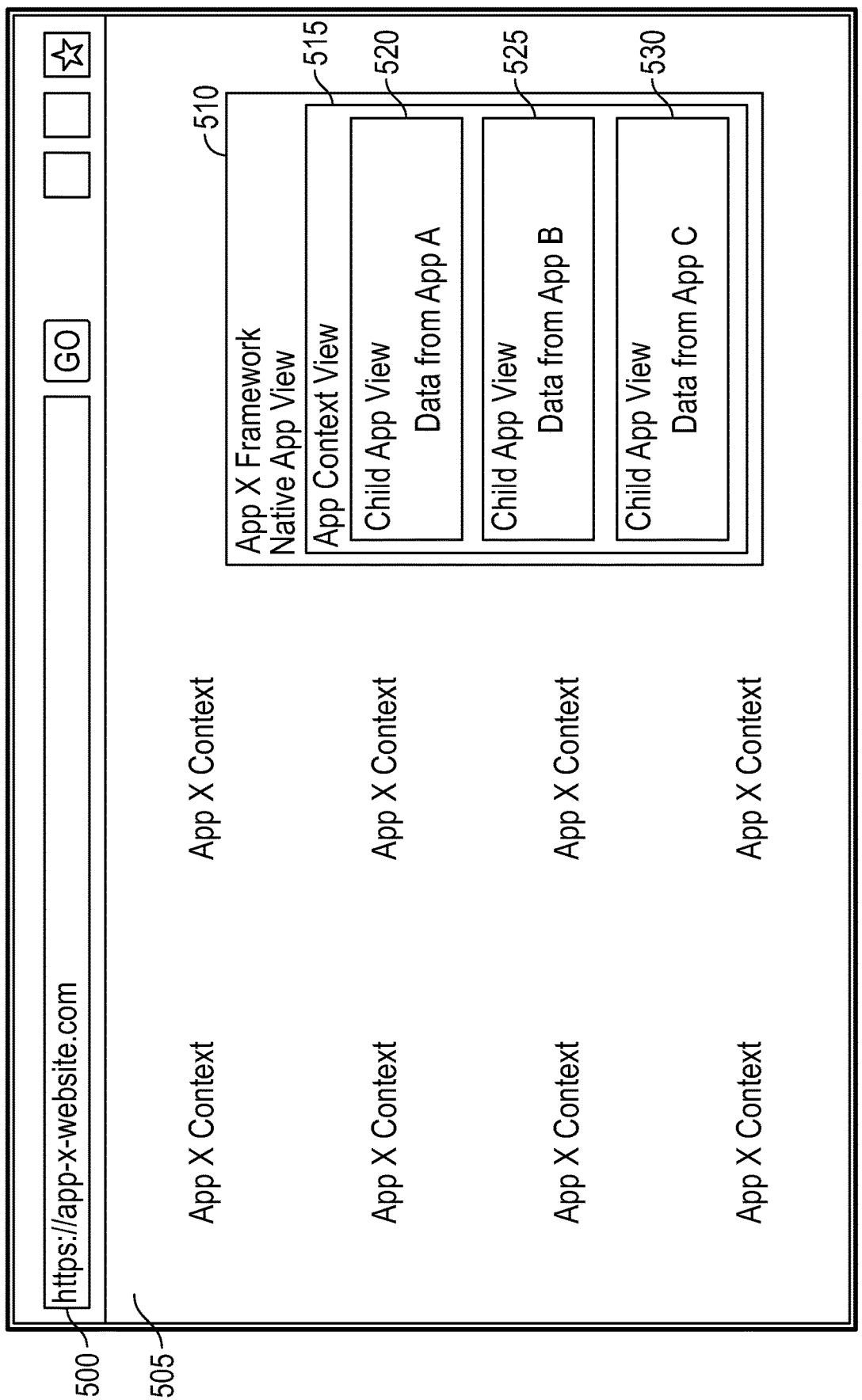
FIG. 5 is a block diagram of an example context view client including information from multiple different apps inside a native app according to an example embodiment.
Figure 6:
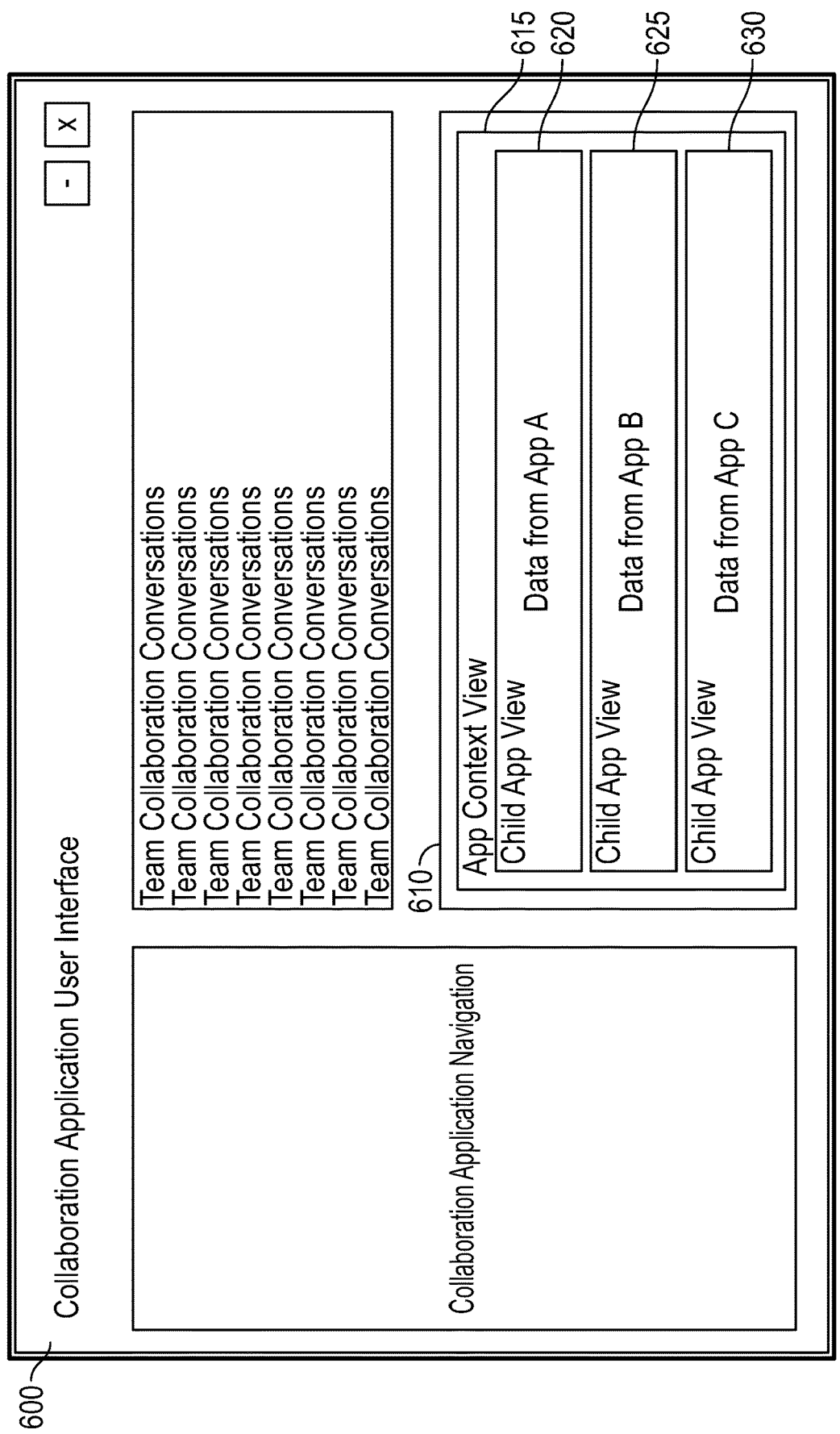
FIG. 6 is a block diagram of an example of visualization of a context view client inside of a native app view according to an example embodiment.

FIG. 5 is an example context view client including information from multiple different apps inside a native app according to an example embodiment.

The Context View Client may also be delivered through a Native App View. App's will provide development kits that allow native views to be developed within their App (500). The App will provide area within the webpage (505) where the Native App View can be rendered at(510). When this is visible, the Context View Client is loaded and visible in a window within the web browser (510). The process described in Diagram 3.0 is run. Once it is finished it will render the App Context View (515). Each Child App View is then rendered (520, 525, 530).

The Context View Client may also be delivered through a Native App Views in Collaboration Applications. Examples of Collaboration Applications include but not limited to platforms such as Slack and Microsoft Teams. App's will provide development kits that allow native views to be developed within their Application (600). The Collaboration Application will provide area within the user interface (610) where the Native App View can be rendered (615). When this is visible, the Context View Client is loaded and visible within the Collaboration Application user interface (610). The process described in Diagram 3.0 is run. Once it is finished it will render the App Context View (615). Each Child App View is then rendered (620, 625, 630).

Figure 7:
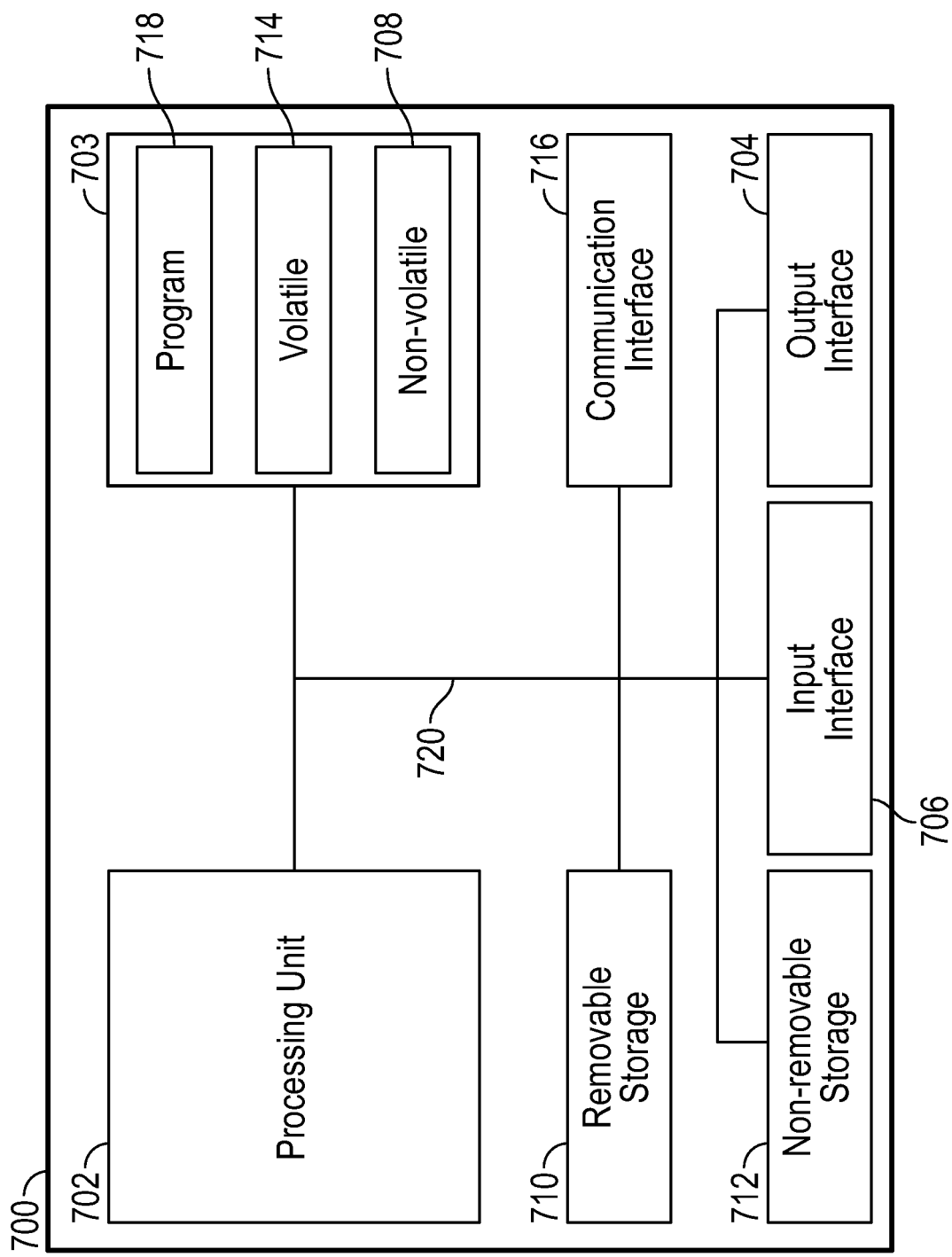
FIG. 7 is a block schematic diagram of a computer system to implement one or more example embodiments.

FIG. 7 is a block schematic diagram of a computer system 700 to implement and perform methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more devices and methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 718 along with the workspace manager 722 may be used to cause processing unit 702 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
opening an application;
loading a view client;
selecting a context view having information generated by the opened application in a first portion of the context view;
importing data from one or more further applications using stored authentication information for each such further application; and
rendering the imported data in one or more portions of the view dedicated to each of the one or more further applications, wherein selecting a context view comprises a context match based on context view settings, wherein the context view settings are stored in a database, and wherein the authentication information is provided to the one or more further applications via an authentication API Call Request.

2. The method of claim 1 and further comprising:
obtaining render data for the one or more further applications from the one or more further applications; and
using the obtained render data to render the imported data.

3. The method of claim 2 wherein the render data is Obtained via a get render data API call and response.

4. The method of claim 1 and further comprising receiving an authentication API Call Response from the one or more further applications.

5. The method of claim 4 wherein the one or more further applications are coupled to the application view via a public network.

6. A machine-readable storage device having instructions for execution by a processor of a machine to cause the processor to perform operations to perform a method, the operations comprising:
opening an application;
loading a view client;
selecting a context view having information generated by the opened application in a first portion of the context view;
importing data from one or more further applications using stored authentication information for each such further application; and
rendering the imported data in one or more portions of the view dedicated to each of the one or more further applications, wherein selecting a context view comprises a context match based on context view settings, wherein the context view settings are stored in a database and wherein the authentication information is provided to the one or more further applications via an authentication API Call Request.

7. The device of claim 6 and further comprising:
obtaining render data for the one or more further applications from the one or more further applications; and
using the obtained render data to render the imported data.

8. The device of claim 7 the render data is obtained via a get render data API call and response.

9. The device of claim 7 and further comprising receiving an authentication API Call Response from the one or more further applications.

10. The device of claim 6 wherein the one or more further applications are coupled to the application view via a public network.

11. A device comprising:
a processor; and
a memory device coupled to the processor and having a program stored thereon for execution by the processor to perform operations comprising:
opening an application;
loading a view client;

selecting a context view having information generated by the opened application in a first portion of the context view;

importing data from one or more further applications using stored authentication information for each such further application; and rendering the imported data in one or more portions of the view dedicated to each of the one or more further applications wherein selecting a context view comprises a context match based on context view settings, wherein the context view settings are stored in a database, and wherein the authentication information is provided to the one or more further applications via an authentication API Call Request.

12. The device of claim 11 and further comprising:

obtaining render data for the one or more further applications from the one or more further applications; and using the obtained render data to render the imported data.

13. The device of claim 12 wherein the render data is obtained via a get render data API call and response.

* * * * *